Oct. 9, 1951  J. A. CHURCH  2,570,645
INSTRUMENT BOARD FOR MOTOR VEHICLES
Filed April 12, 1948  2 Sheets-Sheet 1

Inventor
Jack A. Church

Oct. 9, 1951 J. A. CHURCH 2,570,645
INSTRUMENT BOARD FOR MOTOR VEHICLES
Filed April 12, 1948 2 Sheets-Sheet 2
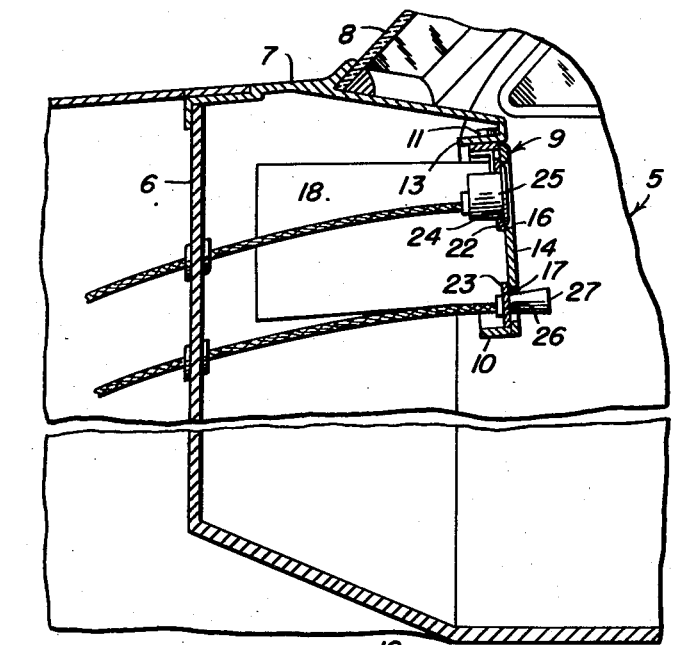
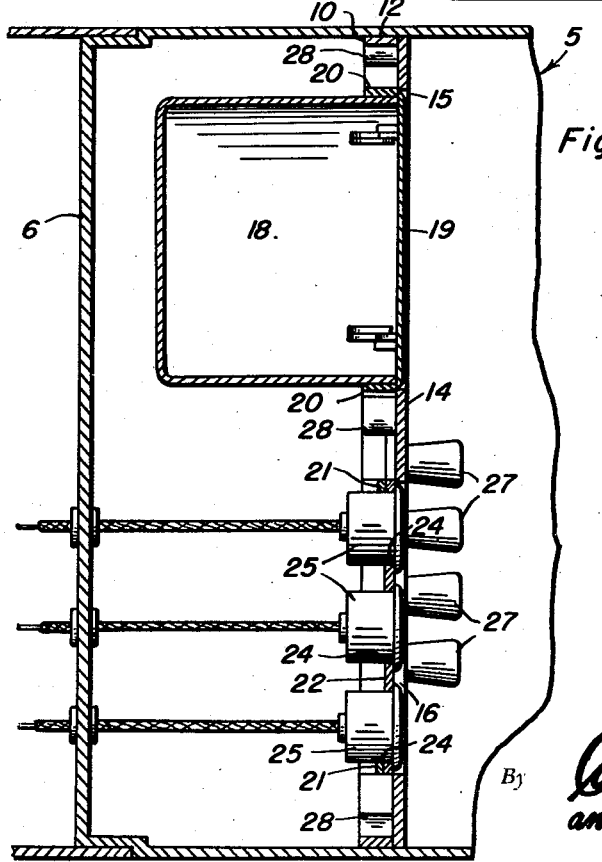
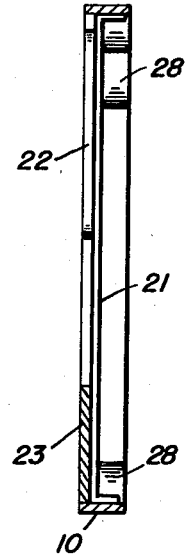
Inventor
Jack A. Church Patented Oct. 9, 1951

2,570,645

UNITED STATES PATENT OFFICE 2,570,645

INSTRUMENT BOARD FOR MOTOR VEHICLES

Jack A. Church, Corona Del Mar, Calif.

Application April 12, 1948, Serial No. 20,417

1 Claim. (Cl. 180—90)

This invention relates to instrument boards for automobiles and other motor vehicles.

Motor vehicle instrument boards are usually directly and permanently carried by the cowl and the sides of the vehicle body, and are formed with a number of openings through which the instruments are passed so that flanges on the instruments engage the front of the board, and the instruments are secured in place by suitable means at the back of the board to which access can only be had with difficulty. Also, connections to certain of the instruments, such as electrical leads and flexible controls or drives, have usually been at the back of the board where access to them is difficult. The present invention provides a construction by means of which these disadvantages are overcome.

According to this invention, the instrument board comprises a skeleton instrument support including a frame extending from side to side of the vehicle body and attached to the cowl and to the sides of the body, and having means for mounting instruments thereon, and a masking or face plate removably secured to and covering the instrument support and provided with openings through which the instruments may be viewed or passed for manipulation. Thus, by removing the masking or face plate, the various instrument securing means and connections are readily accessible. The term "instruments" as used herein, is intended to include such articles as switches, cigarette lighters, choke and other controls, glove compartments, etc.

The exact nature of the present invention will become apparent from the following description when considered in connection with the accompanying drawings, in which:

Figure 3 is a vertical section taken on line 3—3 of Figure 1.

Figure 4 is a horizontal section taken on line 4—4 of Figure 1.

Figure 5 is an enlarged vertical section through the instrument support, taken on line 5—5 of Figure 2.

Figure 1:
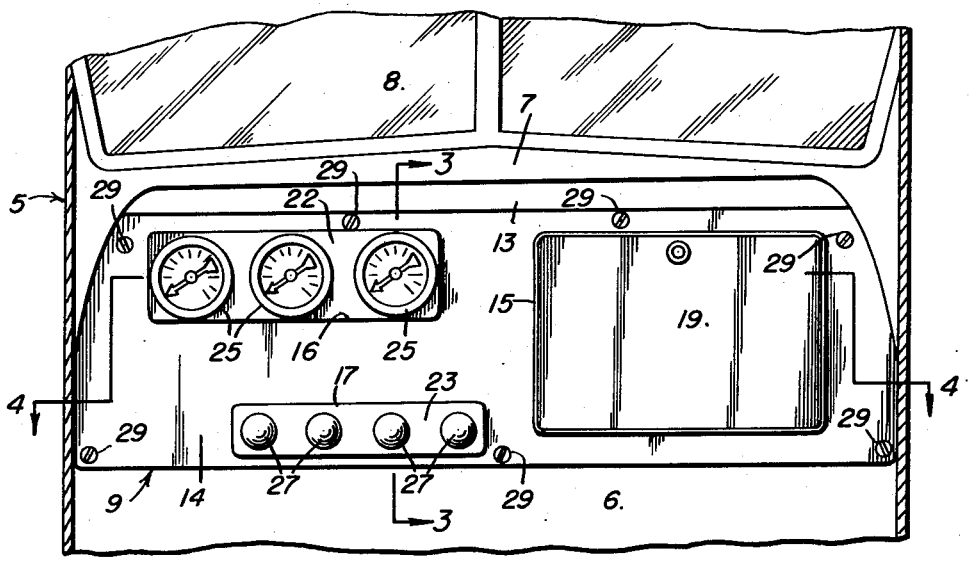
Figure 1 is a fragmentary vertical transverse section through the body of an automobile provided with an instrument board constructed in accordance with the present invention, the plane of section being rearwardly of the instrument board.
Figure 2:
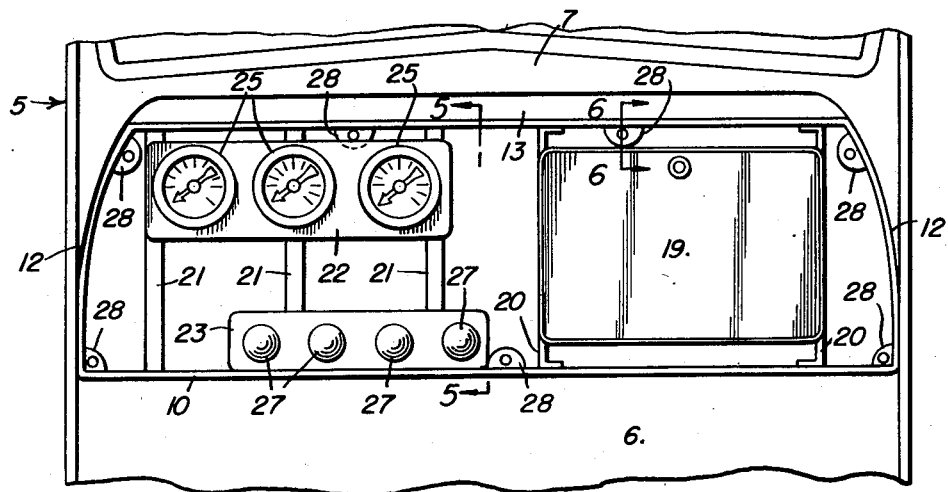
Figure 2 is a view similar to Figure 1 with the masking or face plate removed.
Figure 6:
Figure 6 is an enlarged fragmentary section through the instrument support, taken on line 6—6 of Figure 2.

Referring in detail to the drawings, 5 indicates the body of an automobile having a dashboard 6, a cowl 7, a windshield 8, and an instrument board 9.

The instrument board 9 comprises a skeleton instrument support consisting of a continuous open strap metal frame 10 extending from side to side of the vehicle body 5 and attached, as by bolting at 11 and by welding at 12, respectively to the rear depending angular extension 13 of cowl 7 and to the sides of the body 5, and having means for mounting instruments therein, and a flat flangeless masking or face plate 14 removably secured to and covering the instrument support and provided with openings 15, 16 and 17, through which the instruments may be viewed or passed for manipulation.

As shown, there is a glove compartment comprising an open front body 18 and a hinged front door 19, the front of the body being fitted between and suitably secured to vertical metal straps 20 secured to and connecting the top and bottom members of frame 10, and the door 19 being openable through the opening 15. Other vertical metal straps 21 support plates 22 and 23 within the frame 10, and the plate 22 has openings 24 in which a group of instruments 25, such as a speedometer, a fuel gauge, and an ammeter, are suitably secured so as to be viewed through opening 16. The plate 23 has openings 26 through which are passed a group of switch control stems and choke and other control wires provided with knobs 27 which project through opening 17. The switches, such as an ignition switch and a light switch, may be suitably mounted on the back of plate 23.

Nut members 28 are arranged within and welded or otherwise fixed to the frame 10 at suitable spaced points, and bolts 27 are passed through the masking or face plate 14 and threaded into these nut members to removably secure said face plate to the frame. It will be readily seen that, upon removing the face plate 14, access may be readily had to the various instruments and their securing means and connections.

From the foregoing description, it is believed that the construction and advantages of the present invention will be readily understood and appreciated by those skilled in the art. Minor changes in details of construction are contemplated, such as fairly fall within the spirit and scope of the invention as claimed.

Having described the invention what is claimed as new is:

In combination with a motor vehicle body having a cowl, an instrument board comprising a skeleton instrument support including a continuous open frame extending from side to side of the vehicle body and attached to the cowl and to the sides of the body and having means for mounting instruments therein, and a flat flangeless face plate extending from side to side of the vehicle body and removably secured to and covering the instrument support, said face plate being provided with openings through which the instruments are exposed to view and for manipulation, said means for mounting instruments including a plurality of plates mounted within the frame and each having a plurality of openings to receive a plurality of instruments arranged in a group, the instruments of each group being exposed through an opening of the face plate.

JACK A. CHURCH.

REFERENCES CITED

The following references are of record in the file of this patent:

UNITED STATES PATENTS

| Number | Name | Date |
|---|---|---|
| 1,296,182 | Hammond | Mar. 4, 1919 |
| 1,945,717 | Woodall | Feb. 6, 1934 |
| 2,423,597 | Hurn | July 8, 1947 |

FOREIGN PATENTS

| Number | Country | Date |
|---|---|---|
| 521,462 | Great Britain | May 22, 1940 |